US009998322B2

(12) United States Patent
Hanko et al.

(10) Patent No.: US 9,998,322 B2
(45) Date of Patent: *Jun. 12, 2018

(54) METHOD AND SYSTEM FOR BALANCING STORAGE DATA TRAFFIC IN CONVERGED NETWORKS

(71) Applicant: Drivescale, Inc., Sunnyvale, CA (US)

(72) Inventors: James G. Hanko, Redwood City, CA (US); Christopher Unkel, Palo Alto, CA (US)

(73) Assignee: Drivescale, Inc., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/702,920

(22) Filed: Sep. 13, 2017

(65) Prior Publication Data

US 2018/0006874 A1     Jan. 4, 2018

Related U.S. Application Data

(63) Continuation of application No. 14/819,775, filed on Aug. 6, 2015, now Pat. No. 9,794,112.

(51) Int. Cl.
| | |
|---|---|
| *H04L 12/24* | (2006.01) |
| *H04L 12/931* | (2013.01) |
| *H04L 29/08* | (2006.01) |
| *H04L 12/26* | (2006.01) |
| *H04L 12/803* | (2013.01) |
| *G06F 3/06* | (2006.01) |

(52) U.S. Cl.
CPC ........ *H04L 41/046* (2013.01); *H04L 43/0894* (2013.01); *H04L 49/501* (2013.01); *H04L 67/1097* (2013.01); *G06F 3/0613* (2013.01); *H04L 43/028* (2013.01); *H04L 43/062* (2013.01); *H04L 47/125* (2013.01)

(58) Field of Classification Search
CPC ... H04L 49/501; H04L 47/125; H04L 41/046; G06F 3/0613
See application file for complete search history.

(56) References Cited

U.S. PATENT DOCUMENTS

| | | | |
|---|---|---|---|
| 6,438,141 B1 | 8/2002 | Hanko et al. | 370/477 |
| 6,868,062 B1 * | 3/2005 | Yadav | H04L 43/026 370/231 |

(Continued)

*Primary Examiner* — Lashonda Jacobs
(74) *Attorney, Agent, or Firm* — Alfred A. Equitz (57) ABSTRACT

Methods for balancing storage data traffic in a system in which at least one computing device (server) coupled to a converged network accesses at least one storage device coupled (by at least one adapter) to the network, systems configured to perform such methods, and devices configured to implement such methods or for use in such systems. Typically, the system includes servers and adapters, and server agents implemented on the servers and adapter agents implemented on the adapters are configured to detect and respond to imbalances in storage and data traffic in the network, and to redirect the storage data traffic to reduce the imbalances and, thereby to improve the overall network performance (for both data communications and storage traffic). Typically, each agent operates autonomously (except in that an adapter agent may respond to a request or notification from a server agent), and no central computer or manager directs operation of the agents.

36 Claims, 2 Drawing Sheets

(56) References Cited

U.S. PATENT DOCUMENTS

| | | | |
|---|---|---|---|
| 2003/0179707 A1 | 9/2003 | Bare | 370/235 |
| 2003/0200477 A1* | 10/2003 | Ayres | G06F 13/102 |
| | | | 714/2 |
| 2005/0050187 A1* | 3/2005 | Freimuth | H04L 47/15 |
| | | | 709/223 |
| 2005/0259632 A1* | 11/2005 | Malpani | H04L 67/101 |
| | | | 370/351 |
| 2007/0002738 A1* | 1/2007 | McGee | H04L 45/12 |
| | | | 370/230 |
| 2007/0156879 A1* | 7/2007 | Klein | H04L 41/5019 |
| | | | 709/223 |
| 2010/0017545 A1 | 1/2010 | Gildfind et al. | 710/29 |
| 2010/0153964 A1* | 6/2010 | Thai | G06F 9/541 |
| | | | 718/105 |
| 2010/0247094 A1* | 9/2010 | Young | H04L 41/142 |
| | | | 398/25 |
| 2011/0280404 A1* | 11/2011 | Jennas, II | H04L 9/0827 |
| | | | 380/278 |
| 2013/0311719 A1* | 11/2013 | Doedline, Jr. | G06F 3/0613 |
| | | | 711/114 |
| 2014/0089735 A1 | 3/2014 | Barrett et al. | 714/27 |
| 2014/0223027 A1* | 8/2014 | Mullapudi | H04L 45/66 |
| | | | 709/238 |
| 2015/0029848 A1* | 1/2015 | Jain | H04L 47/6215 |
| | | | 370/235 |
| 2015/0286419 A1* | 10/2015 | Guo | G06F 3/0613 |
| | | | 711/114 |

\* cited by examiner

METHOD AND SYSTEM FOR BALANCING STORAGE DATA TRAFFIC IN CONVERGED NETWORKS

CROSS-REFERENCE TO RELATED APPLICATION

The present application is a continuation of U.S. patent application Ser. No. 14/819,775, entitled "Method and System for Balancing Storage Data Traffic in Converged Networks," filed on Aug. 6, 2015, and issued as U.S. Pat. No. 9,794,112, and naming James G. Hanko and Christopher Unkel as inventors.

TECHNICAL FIELD

The invention pertains to methods and systems in which computing devices coupled to a network access storage devices coupled via adapters to the network, and to devices for implementing such methods and systems. In some embodiments, the invention pertains to balancing (e.g., in an effort to optimize) storage data traffic in systems in which computing devices (servers) coupled to a network operate to access storage devices, also coupled by adapters to the network.

BACKGROUND

In the past, data centers typically implemented two, completely separate, network infrastructures: a data communication network (typically based on Ethernet), and a separate "storage" network for storage access. A typical storage network implemented the conventional Fibre Channel protocol. The expressions "data communications network" and "data network" are used herein as synonyms to denote a network in a class distinct from the class of "storage networks" in the sense that a storage network is configured and employed to carry primarily "storage data" traffic (where "storage data" denotes data retrieved from, or to be stored on, at least one storage device), and a data network is configured and employed to carry primarily other data traffic (i.e., data which is not storage data).

Undesirably, however, implementation of multiple network types (e.g., separate data and storage networks) increases the capital and operational costs of running a data center.

Recently, many data centers have begun to investigate use of (and some have begun to use) a single network which carries both storage data traffic and other (non-storage data) traffic. Such a single network will be referred to herein as a "converged network." An example of a converged network is an Ethernet based network on which all traffic is sent between servers coupled to the network and storage devices coupled (via adapters) to the network. Unfortunately, the two types of network traffic (storage data traffic and other data traffic) to be sent over a converged network have different characteristics.

Data networks (e.g., those implementing Ethernet with the Internet Protocol), in order to carry traffic other than storage data traffic, can be (and thus are typically) implemented as un-managed or minimally managed networks. This makes it simple to add and remove computers and other hardware to or from a data network. For example, the DHCP protocol can typically provide (without human intervention) to new devices all the information they need to operate on a data network.

However, network loops can cause serious problems in data networks (i.e., continuous forwarding of packets that should be dropped). For this reason, data networks often implement a protocol (e.g., the Spanning Tree Protocol) to ensure that only one path is known between any two devices on the data network. Redundant data paths are rarely set up explicitly on data networks. Further, traffic on data networks is relatively unpredictable, and applications are usually written to tolerate whatever bandwidth is available on data networks.

In contrast, storage networks are usually managed networks. A network administrator typically manually assigns what computers can communicate with which storage devices on a storage network (i.e., there is usually no self-configuration). There has been little development in making the network connections (in a storage network which is implemented to be separate from a data network) adaptable to changing conditions. Further, in order to provide the high level of availability and fault tolerance typically required for low level data storage, there are typically fully redundant paths between a storage device (coupled to a storage network) and a computer.

As a result of the differences between storage networks (and the storage data traffic thereof) and data networks (and the non-storage data traffic thereof), combining both storage data traffic and other traffic in a converged network can lead to imbalances in network utilization, which can reduce the overall performance of applications in a data center. Typical embodiments of the present invention address such imbalances in utilization of a converged network, e.g., to allow a data center's applications to approach the maximum performance available.

The following definitions apply throughout this specification, including in the claims:

"storage device" denotes a device which is configured to store and retrieve data (e.g., a disk drive). Typically storage devices are accessed using Logical Block Address (LBA) and a number of blocks. A logical block is a fixed sized chunk of the total storage capacity (e.g., 512 or 4096 bytes). A traditional rotating disk drive is an example of a storage device;

"server" denotes a computing device configured to access and use a storage device across a network (a converged network) to store and retrieve data (e.g., files and/or applications);

"adapter" denotes a device configured to connect a storage device, or a storage system (e.g., a JBOD) comprising two or more storage devices, to a network (e.g., a converged network). In typical embodiments of the invention, each storage device is normally accessible to a server via two or more adapters in order to provide failure tolerant access to data stored on the storage device;

"interface" denotes a component of a server or adapter that connects the device (the server or adapter) to a network (e.g., a converged network). Examples of an interface are a physical device (i.e., a Network Interface Controller (NIC)) and a software-defined wrapper of multiple NICs (as for link aggregation). In typical embodiments of the invention, an interface is a hardware or software element that has its own Internet Protocol (IP) address in a converged network;

"agent" denotes a software or hardware component or subsystem, of a server (or an adapter), configured to run on the server (or adapter) during operation of the server (or adapter) to exchange (or prepare for the exchange of) storage data traffic on a network (e.g., a converged network). In some embodiments of the invention, not all servers and adapters on a converged network have agents. However, coupling of non-participating servers and/or adapters (servers and/or adapters without agents) to a network may limit the degree of balancing that can be achieved (in accordance with embodiments of the invention); and "data path" denotes a path along which data is sent between a storage device and a server via an adapter, using one interface on each of the adapter and the server (i.e., a path from the storage device to the server through the adapter interface and through the server interface, or a path from the server to the storage device through the server interface and the adapter interface). In an IP network, a data path can typically be denoted by the combination of the IP address of the server's interface and the IP address of the adapter's interface, and, optionally, also by the port number to be used at the adapter. However, in the case of link aggregation, the full path would depend on the actual interface used for the path within the group of interfaces bonded into one IP address.

When a storage system (e.g., a JBOD) comprising two or more storage devices is coupled to an adapter, and both the adapter and a server are coupled to a converged network, we contemplate that a server (in order to access a storage device of the storage system) will typically specify (i.e., be configured to use) a specific storage device of the storage system (e.g., one disk drive of a JBOD) and a data path between the server and the storage device. In accordance with typical embodiments of the present invention, the data path may be changed from time to time in order to balance storage data traffic on the network. In accordance with some embodiments of the present invention, the data path (between the server and the storage system) may be changed from time to time in order to balance storage data traffic on the network (also, the adapter's selection of the specific device of the storage system to be accessed by the server may change from time to time but such changes would not necessarily be determined in accordance with the invention).

In general, when storage data traffic is combined with other data traffic on a converged network, the attributes of the different types of traffic can combine to result in inefficient use of the network's overall bandwidth, limiting the performance of the data communications traffic and/or the storage traffic.

For example, it is common for a modern server computer to include two or more 1 Gbps or 10 Gbps network interfaces (referred to herein as "interfaces" in the context that the server is connected to a converged network). Many such servers run a software package (e.g., the Hadoop open source software package) that allows a large number of servers to work together to solve problems involving massive amounts of data. However, such software (e.g., Hadoop) typically requires each server to have a unique name and address. Therefore the data communications traffic between servers running the software (e.g., Hadoop) will typically only use one of the two (or more) network connections available on each server.

In contrast, storage data traffic is usually configured to have redundant paths between servers and disk drives in order to survive failures of any of the components. These redundant paths can be used to redirect storage data traffic (e.g., spread storage data traffic among network interfaces) to avoid network interfaces which are made busy by data communications traffic (non-storage traffic). However, the standard mechanisms (e.g., Multipath I/O or "MPIO" methods) for implementing this redirection create a severe performance penalty in the storage data traffic on a converged network. Specifically, the normal storage data load spreading mechanisms are based on sending storage commands across all available interfaces in round-robin fashion, or determining some measure of how much work is outstanding on each link (e.g., number of commands outstanding, or total number of bytes outstanding, or some other measure), and sending commands to the 'least busy' interface. The reason that these mechanisms cause a large performance penalty for storage data traffic between servers and disk drives is that, to obtain maximum performance, the commands executed by a disk drive must be to consecutive locations on a disk. If commands are not sent to access consecutive locations, then a 'seek' operation is required to move the disk drive's read/write heads to a new location. Each such seek operation will typically reduce the overall performance by approximately 1% or more. Conventional spreading mechanisms (round-robin or 'least-busy' spreading mechanisms) increase the number of seeks required to execute a sequence of disk access commands, because they frequently cause consecutive commands in the sequence to take different paths from the server to the disk drive. The different paths will have different processing times and latencies (due to other operations on each path), so the commands issued in one order will often be executed in a different order. Each reordering will cause a seek, and thereby reduce the overall data carrying capacity. It has been observed that these conventional spreading mechanisms, when applied to Hadoop storage operations, reduce the total performance of the storage data traffic by approximately 75% (i.e., the amount of storage data that can be transferred is about 25% of the amount that is possible without using round-robin or least-busy mechanisms).

Another conventional technology, known as 'link aggregation' is sometimes applied to split traffic, between a first device (typically, a server) having multiple interfaces available to couple the device to a network, and a second device (typically, another server) also having multiple interfaces available to couple the devices to the network, between the set of all interfaces which are available to couple the devices to the network. In accordance with link aggregation, to achieve a kind of load balancing, a new choice of one of the first device's interfaces and one of the second device's interfaces is made (e.g., in a random or pseudorandom manner) before each new flow of data values (i.e., each new sequence of data values which are not to be transmitted out of sequence) is transmitted from the chosen interface of one of the devices over the network to the chosen interface of the other device. This allows data communication traffic (averaged over many flows) to use all the available interfaces and keeps a rough balance between the amount of data sent on each interface (unless one interface fails).

Conventionally, it is not recommended to perform link aggregation to transmit storage data over a network. However, even if a form of link aggregation were used (contrary to conventional recommended practice) in an effort to balance storage data traffic over a converged network between multiple interfaces of a server and multiple interfaces of an adapter, such use of link aggregation would not prevent significant imbalances in storage data traffic in the converged network. Significant imbalances would result from the design decisions necessary to maintain the fault tolerance of the storage traffic. That is, the need for a fully redundant path to each storage device (via at least one adapter) from a server requires that, each storage device (or storage subsystem comprising multiple storage devices) must be attached to the network by two completely separate network-connected devices (i.e., two separate adapters), each coupled between the storage device (or storage subsystem) and the network. Otherwise, if there were only one adapter, the failure of the adapter would render the storage device (or subsystem) unusable. Since each such adapter must be a separate device, link aggregation cannot balance the network load between two adapters providing redundant data paths to the same storage device (or storage subsystem), and cannot prevent significant imbalances in storage data traffic through one adapter relative to storage data traffic through another adapter providing a redundant data path to the same storage device (or storage subsystem). Because the adapters are separate devices, one can be busier, and therefore slower, than the other one(s) that can access the same storage device. In contrast, typical embodiments of the present invention can alleviate storage data traffic imbalances (and prevent significant storage traffic imbalances) in a converged network, even when link aggregation is in use.

BRIEF DESCRIPTION OF THE INVENTION

Herein, the term "bandwidth" of a system (e.g., a network, or a device coupled to a network, or a network interface of a device which may be coupled to a network) denotes either "consumed bandwidth" of the system or "available bandwidth" of the system. The expression "consumed bandwidth" of a system herein denotes data rate (bit rate) through the system (e.g., the rate at which data traffic is occurring through the system, or an average or other statistical characterization of the rate at which data traffic has occurred through the system over an interval of time). The expression "full available bandwidth" of a system herein denotes the maximum possible data rate (bit rate) of the system (i.e., the maximum rate at which data traffic could occur through the system). The expression "available bandwidth" of a system herein denotes the full available bandwidth of the system minus the system's consumed bandwidth.

In some embodiments, the invention is a method for balancing storage data traffic (e.g., in an effort to optimize the storage data traffic) in a system in which computing devices (referred to herein as "servers"), coupled to a converged network, access storage devices coupled (by adapters) to the network. A set of agents ("server agents") implemented on the servers and a set of agents ("adapter agents") implemented on the adapters are configured to detect and respond to imbalances of storage and data traffic in the overall network, and to redirect the storage data traffic to reduce the imbalances and, thereby to improve the overall network performance (for both data communications and storage traffic). Other embodiments include systems configured to perform such a method, and devices configured to implement such a method or for use in such a system.

Typically, each of the agents (server agents and adapter agents) operates autonomously (except in that an adapter agent may respond to a request or notification from a server agent in some circumstances), and no central computer or manager directs operation of the agents. Typically, an adapter agent only interacts directly with a server agent when the adapter and server (in which they are implemented) provide a storage data path for at least one storage device, server agents never directly communicate with other server agents, and adapter agents never directly communicate with other adapter agents. Nonetheless, typical embodiments of the invention allow all the agents to react to and influence the behaviors of the other agents in order to balance the overall network traffic and to avoid destabilizing behavior. In addition, if any network-coupled device fails, the surviving network-coupled devices will continue to balance the network traffic (and adjust to the results of the failure) without any interruption.

In accordance with typical embodiments, storage data traffic over a converged network is balanced in a fully decentralized manner, with the communication performed to accomplish the balancing occurring only between the endpoints of each data path between an adapter and a server (not between servers or between adapters, or from an adapter to two or more servers). The failure of any participant (i.e., server interface, server agent, adapter interface, or adapter agent) only affects the path that the participant is a member of In general, there is only one-to-one communication between any server agent and an adapter agent (e.g., the server agent does not share this communication with more than one adapter agent). In contrast, conventional methods for balancing storage data traffic among multiple storage devices and multiple servers have not been decentralized in this way.

In accordance with typical embodiments, the server agents and adapter agents operate to collect information about the state of the network, and to cause a server (in an appropriate case) to redirect all the traffic for a storage device from one data path (between the server and the storage device) to a different data path (between the server and the storage device) which is chosen to reduce network imbalances.

In typical embodiments of the inventive method, it is assumed that another entity (e.g., a management or allocation process) has informed each server (and agent thereof) of all the data paths that can be used between the server and each storage device (e.g., disk drive) that the server may access to transfer data to or from the storage device. It is typically further assumed that each server (and agent thereof) has been informed of a preferred data path (for each storage device accessible by the server) between the server and the storage device (e.g., based on static analysis of the network, or determined in a deterministic manner (e.g., a path to an adapter interface having the lowest IP address)).

In a class of embodiments, the invention is a system including at least one server having at least one server interface, wherein the server is configured to be coupled to a converged network by the server interface, and the server is configured to include a server agent; at least one storage device; and at least one adapter configured to be coupled to the storage device and having at least one adapter interface (and optionally also at least one other adapter having at least one adapter interface and configured to couple the storage device to the network), wherein the adapter is configured to couple the storage device to the network via the adapter interface, and the adapter is configured to include an adapter agent.

The adapter agent is coupled and configured:

to determine whether each said adapter interface is overloaded, and to generate an adapter interface overload indication for each said adapter interface, where the adapter interface overload indication for each said adapter interface is indicative of whether the adapter interface is overloaded; and to report to the server agent, in response to a request from the server agent, at least one said adapter interface overload indication (e.g., in response to the request from the server agent, to cause the adapter to assert, to at least one said adapter interface, data indicative of at least one said adapter interface overload indication).

The server agent is coupled and configured:

to cause the server to assert a request to the adapter agent, and to identify at least one adapter interface overload indication asserted (i.e., supplied) to the server by the adapter agent in response to the request; and for a path which includes the server interface and over which the server accesses the storage device via the adapter, to determine whether the path is overloaded, in a manner using the adapter interface overload indication.

In some embodiments, the server agent is coupled and configured to respond to a determination that the path is overloaded including by:

determining whether to select a new path to the storage device for subsequent use, and upon determining that the new path should be selected, causing the server to change the routing of storage data traffic between the server and the storage device to the new path. Preferably, the server agent is coupled and configured to wait, after causing the server to change the routing of storage data traffic between the server and the storage device to the new path, for a time interval of sufficient duration that consequences of the change to the new path can be reflected in results of ongoing monitoring by each said adapter agent of traffic on each adapter interface of the adapter agent, and after the wait, to begin to evaluate (e.g., reevaluate) paths to the storage device, including at least one path other than the new path. In a preferred embodiment, the time interval of the wait is determined by a random number selected as a normal variate of a selected interval (e.g., 10 seconds), subject to predetermined minimum and maximum waits.

In some embodiments, the system includes a first adapter configured to couple the storage device to the network, and a second adapter configured to couple the storage device to the network (and optionally also at least one other adapter configured to couple the storage device to the network), the first adapter includes at least one first adapter interface, and the second adapter includes at least one second adapter interface, the first adapter includes a first adapter agent, and the second adapter includes a second adapter agent, and the server agent is coupled and configured:

to monitor data traffic (e.g., receive traffic and transmit traffic) occurring on each said server interface to determine consumed bandwidth of each said server interface, and to determine, from the consumed bandwidth of each said server interface, available bandwidth of each said server interface; and to identify at least one available bandwidth indication supplied to the server by the first adapter agent in response to a request asserted from the server to the first adapter, wherein each said available bandwidth indication is indicative of available bandwidth of one said first adapter interface, and to identify at least one additional available bandwidth indication supplied to the server by the second adapter agent in response to a request asserted from the server to the second adapter, wherein each said additional available bandwidth indication is indicative of available bandwidth of one said second adapter interface; and to determine available bandwidth on a path which includes the server interface and one said second adapter interface of the second adapter, as the minimum of the available bandwidth on the server interface and the available bandwidth of said one said second adapter interface.

Optionally, the adapter agent is also coupled and configured:

to monitor data traffic (e.g., receive traffic and transmit traffic) occurring on each said adapter interface, and to generate a consumed bandwidth indication for each said adapter interface, where the consumed bandwidth indication for each said adapter interface is indicative of consumed bandwidth of the adapter interface; and to generate an available bandwidth indication for each said adapter interface, where the available bandwidth indication for each said adapter interface is indicative of available bandwidth of the adapter interface; and to report to the server agent, in response to a request from the server agent, at least one said adapter interface overload indication, and at least one said consumed bandwidth indication and/or at least one said available bandwidth indication (e.g., in response to the request from the server agent, to cause the adapter to assert, to at least one said adapter interface, data indicative of at least one said adapter interface overload indication, and at least one said consumed bandwidth indication and/or at least one said available bandwidth indication).

Optionally also, the adapter agent is coupled and configured:

to estimate capacity of the adapter to process additional data (e.g., the adapter's computational load capacity); and/or to filter a raw overload indication value to generate a filtered overload value, where the raw overload indication value is indicative of a determined overload, and the filtered overload value is indicative of whether the determined overload is persistent, and wherein at least one said adapter interface overload indication is indicative of the filtered overload value.

In some embodiments, the adapter agent is coupled and configured to generate an available bandwidth indication for each said adapter interface, where the available bandwidth indication for each said adapter interface is indicative of available bandwidth of the adapter interface, including by aging each planned additional bandwidth use value received from at least one said server agent for one said adapter interface, thereby generating an aged planned bandwidth use value for the adapter interface, and maintaining a sum, for each said adapter interface, of each said aged planned bandwidth use value for the adapter interface. In some such embodiments, the adapter agent is coupled and configured to generate the available bandwidth indication for each said adapter interface, from the adapter interface's full available bandwidth, at least one measurement of the adapter interface's consumed bandwidth, an indication of the adapter's capacity to process additional data, and the sum for the adapter interface of each said aged planned bandwidth use value for the adapter interface.

In some embodiments, each server is programmed with software which implements the server agent of said each server, and each adapter is programmed with software which implements the adapter agent of said each adapter. In some embodiments, at least one server agent or at least one adapter agent is implemented in hardware (e.g., at least one said server includes a hardware subsystem which implements the server agent thereof).

Other aspects of the invention are an adapter (programmed or otherwise configured to implement an embodiment of the inventive adapter agent), a disk drive (or other storage device) integrated with such an adapter, a JBOD (or other storage device system) integrated with such an adapter, a server (programmed or otherwise configured to implement an embodiment of the inventive server agent), a hardware implementation of an embodiment of the inventive server agent, and a hardware implementation of an embodiment of the inventive adapter agent.

Other aspects of the invention are methods performed in operation of any embodiment of the inventive system, adapter, storage device, JBOD, server, or other device.

DETAILED DESCRIPTION OF EMBODIMENTS OF THE INVENTION

In a class of embodiments, the invention is a system including at least one server coupled to a converged network by at least one server interface, and at least one storage device coupled to the network by at least two adapters.

An example of such a system will be described with reference to FIG. 1. In the FIG. 1 system, each of servers 1 and 3 (and optionally also other servers) and adapters 5, 7, 9, and 11 (and optionally also other adapters) is coupled to converged network 20. Storage subsystem 13 is coupled by each of adapters 5 and 7 to network 20. Storage subsystem 15 is coupled by each of adapters 9 and 11 to network 20. Each of storage subsystems 13 and 15 may be a disk drive or other storage device, or a storage subsystem (e.g., a JBOD) comprising multiple storage devices.

Server 1 includes interface 2 (which is configured to connect server 1 to network 20), and server 1 is configured to include (e.g., is programmed with software implementing) application subsystem 4. Server 1 is also configured to include (e.g., is programmed with software implementing) server agent subsystem 6. Server 3 includes interface 8 (which is configured to connect server 3 to network 20), and is configured to include (e.g., is programmed with software implementing) application subsystem 10. Server 3 is also configured to include (e.g., is programmed with software implementing) server agent subsystem 12.

In some implementations, each of interfaces 2 and 8 is implemented as a physical device (i.e., a Network Interface Controller ("NIC")). In other implementations, each of interfaces 2 and 8 is implemented as a software-defined wrapper of multiple NICs. In typical embodiments of the invention, each of interfaces 2 and 8 is a hardware or software element that has its own Internet Protocol (IP) address.

Adapter 5 is configured to include (e.g., is programmed with software implementing) adapter agent subsystem 14. Adapter 7 is configured to include (e.g., is programmed with software implementing) adapter agent subsystem 16. Adapter 9 is configured to include (e.g., is programmed with software implementing) adapter agent subsystem 18. Adapter 11 is configured to include (e.g., is programmed with software implementing) adapter agent subsystem 22.

In an exemplary embodiment, network 20 is an Ethernet network, and elements 1, 3, 5, 7, 9, and 11 are configured to communicate over network 20 in accordance with the iSCSI (Internet Small Computer System Interface) networking protocol. The iSCSI protocol is a conventional Internet Protocol-based storage networking standard which allows transmission of data over LANs, WANs, or the internet. In this exemplary embodiment, elements 1, 3, 5, 7, 9, and 11 (and agents 6, 12, 14, 16, 18, and 22) use the iSCSI network protocol in a simple manner (much simpler than in many conventional applications), in which communication is allowed between server 1 (or 3) and any of adapters 5, 7, 9, or 11, but there is just one connection path between each server (1 or 3) and each adapter (5, 7, 9, or 11) at a time.

In the exemplary embodiment:

adapter 5 includes an iSCSI interface for communication via network 20 with server 1 or 3. Communication between adapter agent 14 and server agents 6 and 12 in accordance with the invention is implemented by this iSCSI interface. Adapter 5 is also configured to communicate with storage subsystem 13 in accordance with the well-known Serial Attached SCSI ("SAS") protocol, to implement storage data traffic between server 1 (or 3) and subsystem 13;

adapter 7 includes an iSCSI interface for communication via network 20 with server 1 or 3. Communication between adapter agent 16 and server agents 6 and 12 in accordance with the invention is implemented by this iSCSI interface. Adapter 7 is also configured to communicate with storage subsystem 13 in accordance with the SAS protocol, to implement storage data traffic between server 1 (or 3) and subsystem 13;

adapter 9 includes an iSCSI interface for communication via network 20 with server 1 or 3. Communication between adapter agent 18 and server agents 6 and 12 in accordance with the invention is implemented by this iSCSI interface. Adapter 9 is also configured to communicate with storage subsystem 15 in accordance with the SAS protocol, to implement storage data traffic between server 1 (or 3) and subsystem 15; and adapter 11 includes an iSCSI interface for communication via network 20 with server 1 or 3. Communication between adapter agent 22 and server agents 6 and 12 in accordance with the invention is implemented by this iSCSI interface. Adapter 11 is also configured to communicate with storage subsystem 15 in accordance with the SAS protocol, to implement storage data traffic between server 1 (or 3) and subsystem 15.

Application subsystem 4 of server 1 is configured to initiate accesses to storage devices (e.g., a storage device in subsystem 13 or 15) coupled to network 20. Application subsystem 10 of server 3 is configured to initiate accesses to storage devices (e.g., a storage device in subsystem 13 or 15) coupled to network 20. In typical operation, an entity (e.g., a management or allocation process) has informed application subsystem 4 and agent 6 of all the data paths that can be used between server 1 and each storage device that the server may access to transfer data to or from the storage device, and application subsystem 4 and agent 6 have been informed of a preferred data path (for each storage device accessible by server 1) between server 1 and the storage device (e.g., based on static analysis of the network, or determined in a deterministic manner (e.g., a path to an adapter interface having the lowest IP address)). Similarly, in typical operation, an entity (e.g., a management or allocation process) has informed application subsystem 10 and agent 12 of all the data paths that can be used between server 3 and each storage device that the server may access to transfer data to or from the storage device, and application subsystem 10 and agent 12 have been informed of a preferred data path (for each storage device accessible by server 3) between server 3 and the storage device.

In a typical implementation, each of adapter agent subsystems 14, 16, 18, and 22 (also referred to herein as adapter agents, or agents), and each of server agent subsystems 6 and 12 (also referred to herein as server agents, or agents) is configured in accordance with the invention (e.g., in a manner to be described below) to detect and respond to imbalances in storage data traffic over converged network 20, and to redirect the storage data traffic to reduce the imbalances and, thereby to improve the overall network performance (for both data communications and storage traffic). For example, in a typical implementation, server agent subsystem 6 is configured in accordance with the invention (e.g., in a manner to be described below) to detect and respond (in appropriate circumstances) to imbalances in storage data traffic over network 20 by redirecting storage data traffic from one data path between server 1 and a specific storage device (in subsystem 13 or 15) to another data path between server 1 and the same storage device.

Figure 1:
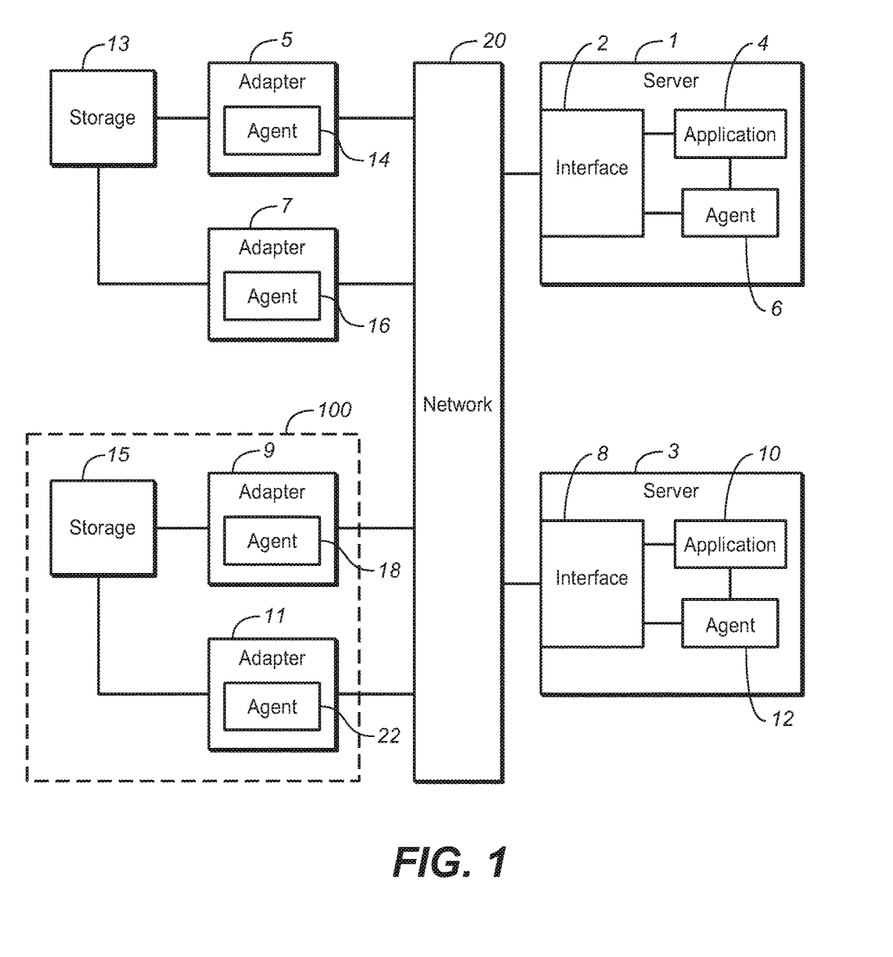
FIG. 1 is a block diagram of an embodiment of the inventive system.
Figure 2:
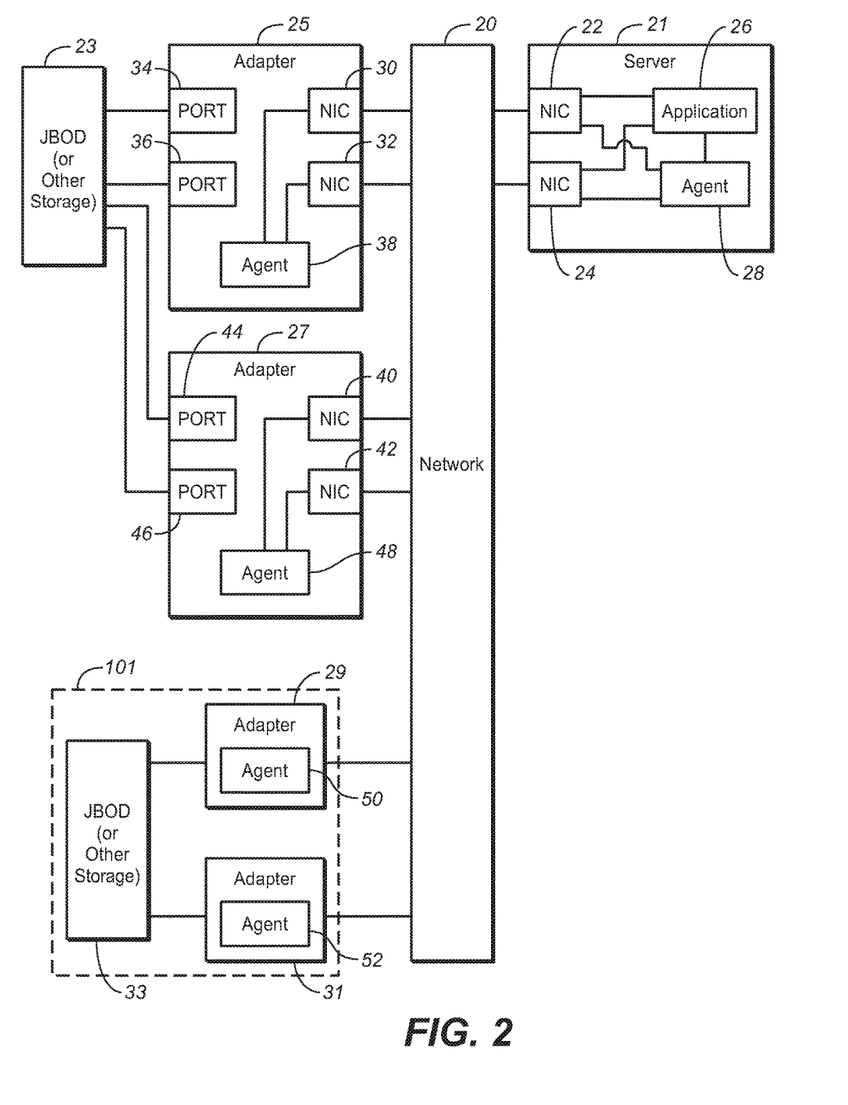
FIG. 2 is a block diagram of another embodiment of the inventive system.

Another embodiment of the inventive system is shown in FIG. 2. In the FIG. 2 system, server 21 (and optionally also other servers) and adapters 25, 27, 29, and 31 (and optionally also other adapters) is coupled to converged network 20 (which may be identical to network 20 of FIG. 1). Storage subsystem 23 is coupled by each of adapters 25 and 27 to network 20. Storage subsystem 33 is coupled by each of adapters 29 and 31 to network 20. Each of storage subsystems 23 and 33 is a storage subsystem comprising multiple storage devices (e.g., each is a JBOD comprising multiple disk drives).

Server 21 includes interfaces 22 and 24, each of which is a Network Interface Controller (NIC) having its own Internet Protocol (IP) address and configured to connect server 21 to network 20. Server 21 is configured to include (e.g., is programmed with software implementing) application subsystem 26, and is also configured to include (e.g., is programmed with software implementing) server agent subsystem 28.

Adapter 25 includes interfaces 30 and 32, each of which is a Network Interface Controller (NIC) having its own Internet Protocol (IP) address and configured to connect adapter 25 to network 20, and adapter 25 is configured to include (e.g., is programmed with software implementing) adapter agent subsystem 38. Adapter 25 also includes ports 34 and 36, each coupled to storage subsystem 23, and is configured to couple a storage device (within subsystem 23) via either of ports 34 or 36, and either of interfaces 30 or 32, to network 20.

Adapter 27 includes interfaces 40 and 42, each of which is a Network Interface Controller (NIC) having its own Internet Protocol (IP) address and configured to connect adapter 27 to network 20, and adapter 27 is configured to include (e.g., is programmed with software implementing) adapter agent subsystem 48. Adapter 27 also includes ports 44 and 46, each coupled to storage subsystem 23, and is configured to couple a storage device (within subsystem 23) via either of ports 44 or 46, and either of interfaces 40 or 42, to network 20.

Adapter 29 includes multiple interfaces (not shown), each of which is a Network Interface Controller (NIC) having its own Internet Protocol (IP) address and configured to connect adapter 29 to network 20, and adapter 29 is configured to include (e.g., is programmed with software implementing) adapter agent subsystem 50. Adapter 29 also includes multiple ports (not specifically shown), each coupled to storage subsystem 33, and is configured to couple a storage device (within subsystem 33) via any one of the ports and any one of the NICs of adapter 29, to network 20.

Adapter 31 includes multiple interfaces (not shown), each of which is a Network Interface Controller (NIC) having its own Internet Protocol (IP) address and configured to connect adapter 31 to network 20, and adapter 31 is configured to include (e.g., is programmed with software implementing) adapter agent subsystem 52. Adapter 31 also includes multiple ports (not specifically shown), each coupled to storage subsystem 33, and is configured to couple a storage device (within subsystem 33) via any one of the ports and any one of the NICs of adapter 31, to network 20.

In an exemplary embodiment, network 20 is an Ethernet network, and elements 21, 25, 27, 29, and 31 are configured to communicate over network 20 in accordance with the iSCSI (Internet Small Computer System Interface) networking protocol. In this exemplary embodiment, elements 21, 25, 27, 29, and 31 (and agents 28, 38, 48, 50, and 52) use the iSCSI network protocol in a simple manner (much simpler than in many conventional applications), in which communication is allowed between server 21 and any of adapters 25, 27, 29, or 31, but there is just one connection path between the server and each adapter (25, 27, 29, or 31) at a time.

In the exemplary embodiment:

each of interfaces 30 and 32 of adapter 25 is an iSCSI interface for communication via network 20 with server 21. Communication between adapter agent 38 and server agent 28 in accordance with the invention is implemented by this iSCSI interface. Adapter 25 is also configured to communicate with storage subsystem 23 via either of ports 34 or 36 in accordance with the Serial Attached SCSI ("SAS") protocol, to implement storage data traffic between server 21 and subsystem 23;

each of interfaces 40 and 42 of adapter 27 is an iSCSI interface for communication via network 20 with server 21. Communication between adapter agent 48 and server agent 28 in accordance with the invention is implemented by this iSCSI interface. Adapter 27 is also configured to communicate with storage subsystem 23 via either of ports 44 or 46 in accordance with the Serial Attached SCSI ("SAS") protocol, to implement storage data traffic between server 21 and subsystem 23;

adapter 29 includes an iSCSI interface for communication via network 20 with server 21. Communication between adapter agent 50 and server agent 28 in accordance with the invention is implemented by this iSCSI interface. Adapter 29 is also configured to communicate with storage subsystem 33 in accordance with the SAS protocol, to implement storage data traffic between server 21 and subsystem 33; and adapter 31 includes an iSCSI interface for communication via network 20 with server 21. Communication between adapter agent 52 and server agent 28 in accordance with the invention is implemented by this iSCSI interface. Adapter 31 is also configured to communicate with storage subsystem 33 in accordance with the SAS protocol, to implement storage data traffic between server 21 and subsystem 33.

Application subsystem 26 of server 21 is configured to initiate accesses to storage devices (e.g., a storage device in subsystem 23 or 33) coupled to network 20. In typical operation, an entity (e.g., a management or allocation process) has informed application subsystem 26 and agent 28 of all the data paths that can be used between server 21 and each storage device that the server may access to transfer data to or from the storage device, and application subsystem 26 and agent 28 have been informed of a preferred data path (for each storage device accessible by server 21) between server 21 and the storage device (e.g., based on static analysis of the network, or determined in a deterministic manner (e.g., a path to an adapter interface having the lowest IP address)).

In a typical implementation, each of adapter agent subsystems 38, 48, 50, and 52 (also referred to herein as adapter agents, or agents), and server agent subsystem 26 (also referred to herein as a server agent, or agent) is configured in accordance with the invention (e.g., in a manner to be described below) to detect and respond to imbalances in storage data traffic over converged network 20, and to redirect the storage data traffic to reduce the imbalances and, thereby to improve the overall network performance (for both data communications and storage traffic). For example, in a typical implementation, server agent 26 is configured in accordance with the invention (e.g., in a manner to be described below) to detect and respond (in appropriate circumstances) to imbalances in storage data traffic over network 20 by redirecting storage data traffic from one data path between server 21 and a specific storage device (in subsystem 23 or 33) to another data path between server 21 and the same storage device.

There are at least four data paths (e.g., one path through each of interfaces 30, 32, 40, and 42) between each Ethernet port (NIC 22 or 24) of server 21 to each accessible storage device (typically, each is a disk drive), and thus at least eight data paths between server 21 and each accessible storage device. Thus, the FIG. 2 system provides much redundancy for storage device access.

In a typical data center (e.g. one implementing the FIG. 1 system or the FIG. 2 system), a management server (not shown in FIG. 1 or FIG. 2) would be coupled to the network for use in configuring and reconfiguring the data center (e.g., including by informing application subsystem 26 and agent 28 of FIG. 2 all the data paths that can be used between server 21 and each storage device that the server may access vid network 20 to transfer data to or from the storage device).

It is contemplated that some embodiments of the inventive server are programmed (e.g., an application subsystem of the server is programmed) to run a software package (e.g., the Hadoop open source software package) that allows a large number of servers to work together to solve problems (typically involving massive amounts of data). It is also contemplated that a number of such servers (and a number of adapters, each configured to implement an embodiment of the inventive adapter agent) may be coupled to a converged network in a data center (e.g., a Hadoop data center), which might be located in a single building. Each adapter would typically be coupled to a JBOD, such that individual disk drives of the JBOD are accessible by servers over the network via the adapter. Disk drives that are considered "local" to each server would typically be located in one JBOD (or more than one JBODs), and the JBOD or JBODs would typically be mounted in one rack (e.g., one server might make three copies of the data it processes, storing one copy each on two disk drives on one rack, and the third copy on a disk drive on another rack). In such embodiments, the servers would be coupled via the network to allow distributed processing of different subsets of one set (e.g., one large set) of data in parallel (with some of the processing performed in response to commands asserted by each of the servers).

More generally, in typical implementations of the inventive system, server, or adapter, each adapter agent (e.g., agent 14, 16, 18, or 22 of FIG. 1, or agent 38, 48, 50, or 52 of FIG. 2) and each server agent (e.g., agent 6 or 12 of FIG. 1, or agent 28 of FIG. 2) is processing hardware configured with software (e.g., software whose source code is written in the language Python and/or the language C) to operate in accordance with an embodiment of the invention. For example, both the server agent and application subsystem of a server (e.g., both agent 6 and subsystem 4 of server 1 of FIG. 1, or both agent 12 and subsystem 10 of server 3 of FIG. 1) may be implemented in processing hardware (e.g., a computer) configured with software. Typically, no applications (e.g., no application implemented by subsystem 4 of server 1 or subsystem 10 of server 3 of FIG. 1, or subsystem 26 of server 21 of FIG. 2) need to be changed to obtain the advantages of typical embodiments of the invention. Typically, each server agent and adapter agent operates in a way that is invisible to the applications, and any application that uses any of the involved server or adapter interfaces (including those only performing data communications operations) will benefit from the storage data load balancing performed in accordance with the invention.

We next describe operations of each adapter agent and each server agent during operation of an embodiment of the inventive system in accordance with a class of embodiments of the invention. In the description, "receive traffic" (or "receive data") denotes data asserted (i.e., supplied) from the network to an adapter (or a server), and "transmit traffic" (or "transmit data") denotes data asserted (i.e., supplied) to the network from an adapter (or a server). Typically, a single adapter (and a single server) has two interfaces to the network, and it may have more than two interfaces to the network.

In some embodiments, each adapter agent (e.g., each of agents 14, 16, 18, and 22 of FIG. 1, or each of agents 38, 48, 50, and 52 of FIG. 2) is configured to perform all or some of the following operations:

1. the adapter agent monitors the receive traffic and the transmit traffic (e.g., in units of bits per second) occurring on each interface of the adapter, and generates at least one measurement of consumed bandwidth of each said interface. Typically, each monitoring sample is typically taken over a relatively short period of time (e.g., a few seconds), and the adapter agent determines statistical characterizations of the stream of receive data samples and the stream of transmit data samples, to provide separate short term and long term measurements of the consumed bandwidth of (bandwidth being used on) each interface. Since modern NICs are full-duplex (typically, an NIC of an adapter can send and receive simultaneously), independent statistics are typically kept for receive data and transmit data on each interface. In a preferred embodiment, the well-known method of determining an exponential moving average of a value (i.e., in this case, an exponential moving average of receive traffic on an interface in a moving time window of fixed duration, or an exponential moving average of transmit traffic on an interface in a moving time window of fixed duration) is used to determine the statistical characterization of the receive traffic on each interface and the statistical characterization of the transmit traffic on each interface, since such an exponential moving average is inexpensive to calculate. Examples of methods for determining such an exponential (weighted) moving average are described in U.S. Pat. No. 6,438,141 (issued Aug. 20, 2002) with reference to FIG. 8 thereof. In a preferred embodiment, each short term moving average approximates an arithmetic moving average over an interval (window) of 20 seconds (or an interval substantially equal to 20 seconds) and each long term average approximates an arithmetic moving average over an interval (window) of 60 seconds (or an interval substantially equal to 60 seconds). Other window durations and calculation methods can be used to implement other embodiments of the invention;

2. the adapter agent calculates (e.g., estimates) the capacity of the adapter to process additional data. In a preferred embodiment, this is the adapter's computational load capacity. Since processing additional data would involve more computational work, if the adapter is running at its computational capacity, it may not be able to handle additional storage data traffic, even if its interfaces are not being fully utilized. In some embodiments, the adapter agent incorporates the remaining capacity of any other resource that might be consumed by the adapter in handling storage data traffic into its calculation (e.g., estimate) of the adapter's capacity to process additional data. Optionally, the adapter agent also determines a derating factor for the adapter, which the adapter agent multiplies (in some embodiments) with a raw estimated amount of additional available bandwidth per adapter interface to determine a limited estimated amount of additional available bandwidth per adapter interface (e.g., to limit the bandwidth that the adapter agent will report as being available for the interface, as described below);

3. if any server agent has indicated to the adapter agent that the server (in which the server agent is implemented) plans to use future additional bandwidth (on a path including an interface of the adapter) in the near future, the adapter agent maintains a sum of the planned additional future bandwidth use(s) that each such server agent has indicated to the adapter agent for a path (or paths) including the adapter interface. In a preferred embodiment, the adapter agent (of an adapter) will only accept planned bandwidth use notifications from a server only if the server is accessing a storage device (e.g., disk drive) on a path that includes the adapter. The indication by a server agent of planned future bandwidth use is not a reservation or bandwidth allocation, but rather provides notice that the actual consumed bandwidth statistics determined by the adapter agent will likely change in the near future. The purpose of such indications by server agents, and of the sum maintained by the adapter agent, is to eliminate or limit the possibility that the data traffic for many storage devices would be directed to one interface of one adapter at once. The adapter agent typically reduces over time (i.e., "ages") each planned additional bandwidth use notice, and maintains an updated (aged) sum of the aged planned additional bandwidth use values for each interface of the adapter. As new traffic is actually routed through the interface, such new actual traffic is included in the per-interface traffic measurements made by the adapter agent. In a preferred embodiment, the adapter agent ages each planned additional bandwidth use notice by reducing the bandwidth value indicated by the notice exponentially (i.e., implementing an exponential decay of the indicated planned additional bandwidth use value) with a half-life of 20 seconds (or a half-life substantially equal to 20 seconds). Alternatively, other mechanisms and values (e.g., exponential decay half-life values) can be used to achieve desired aging of each indicated planned additional bandwidth use value;

4. the adapter agent determines (calculates) whether each interface of the adapter (in which the agent is implemented) is overloaded, and reports to a server agent (in response to a request from the server agent) an indication of such an overload (if presence of an overload is determined). Such an overload indication may be used by the server to determine whether to try to stop using the interface if possible. The server would typically be configured to use the indication to determine whether a link has been nearly fully utilized for a while and is still fully utilized, and if so to consider the link to be overloaded and to determine whether it would be better to route some storage data traffic elsewhere. The adapter agent may filter a raw overload indication value (indicative of a determined overload) to generate a filtered overload value which is indicative of whether a determined overload is persistent, and then report the filtered overload value (in response to a request from the server agent) rather than the raw overload value. In a typical embodiment, the adapter agent is configured to use a selected bandwidth at which the interface is considered to be fully utilized as an overload bandwidth level. In one preferred embodiment, the overload bandwidth level is selected to be 92.5% of the full available bandwidth of the interface, and the interface is reported (by a filtered overload value) as being overloaded if the overload calculation yields true at least two consecutive times. In a typical embodiment, the overload calculation is considered true if either of the following are true:

the short and long term measurements of consumed transmit bandwidth (e.g., long and short term transmit bandwidth averages) are both above the overload bandwidth level, or the short and long term measurements of consumed receive bandwidth (e.g., long and short term receive bandwidth averages) are both above the overload bandwidth level; or the capacity of the adapter to process data has been (or has nearly been) reached;

5. the adapter agent calculates an estimated amount of available bandwidth per adapter interface (i.e., additional bandwidth that is available for use to accommodate a new storage device's data traffic that might be redirected by a server to the interface). This calculation does not require any knowledge about the state or capabilities of the new storage device, and instead is a determination by the adapter agent of an estimated amount of extra storage data traffic, to or from a storage device, that could be handled by the interface if such extra traffic were directed to the interface. This estimate of available bandwidth is typically calculated from the interface's full available bandwidth (e.g., raw capacity in units of bits per second), the interface's traffic statistics (i.e., at least one measurement of the adapter interface's consumed bandwidth), the adapter's capacity to process additional data (i.e., computational load), and the total indicated future bandwidth notifications for the interface. Since storage data traffic includes, at various times, both read and write traffic, the estimated additional available traffic calculation typically assumes that the additional traffic will be transmit or receive traffic, whichever is already the busiest. This prevents any additional traffic from overloading an already heavily loaded direction of data travel on the interface. In a preferred embodiment, the estimated available bandwidth is based on the average receive and transmit data for the interface plus an estimate of the normal variation in the recent traffic, e.g., a standard deviation, to avoid slowing down processing of existing work. In a preferred embodiment, the estimate of the average and expected variation of the traffic is calculated via a "fast up, slow down" exponential moving average (in which a relatively large weight is applied to the next average value if the most recently generated statistic is greater than the previously generated statistic, and a relatively small weight is applied to the next average value if the most recently generated statistic is less than or equal to the previously generated statistic), as described, for example, in above-cited U.S. Pat. No. 6,438, 141. Such a "fast up, slow down" exponential moving average can approximate the recent average plus one standard deviation of a series using a simple calculation. Also, the estimated total raw available bandwidth may be reduced by a safety factor in order to survive brief surges in traffic through the interface without degrading performance. In one embodiment, the estimated amount of available bandwidth for an adapter interface, denoted as the value "available" in the below equation, is calculated as follows (although it should be understood that additional terms and factors can be factored into the calculation to tune the behavior):

available=(safety_factor*(raw_bandwidth−worst-case))*processing_capacity_derating_factor, where the value "worst-case" is equal to max(transmit_mean_and_variation, receive_mean_and_variation)+sum (aged-future-bandwidth-notices), where "max(a,b)" denotes the value "a" or the value "b," whichever is greater, transmit_mean_and_variation is a measurement of consumed transmit bandwidth for the interface (e.g., an estimate of average transmit data for the interface plus an estimate of normal variation (standard deviation) in the recent transmit traffic), receive_mean_and_variation is a measurement of consumed receive bandwidth for the interface (e.g., an estimate of average receive data for the interface plus an estimate of normal variation (standard deviation) in the recent receive traffic), "sum(aged-future-bandwidth-notices)" is a sum of aged planned additional bandwidth use values for the adapter interface, safety_factor is the above-noted safety factor, raw_bandwidth denotes the full available bandwidth of the interface, and processing_capacity_derating_factor is a derating factor (of the type described above) for the adapter; and/or 6. the adapter agent responds to status requests from server agents (i.e., a status request from the server agent of a server on the same storage data path as the adapter). Typically, the status report returned to the server agent contains, for each adapter interface, the current overload status and the available bandwidth of the interface as described above.

In some embodiments, each server agent (e.g., each of agents 6 and 12 of FIG. 1, or agent 28 of FIG. 2) is configured to perform all or some of the following operations:

1. as do typical embodiments of the adapter agent, the server agent monitors the receive and transmit traffic (e.g., in units of bits per second) occurring on each interface of the server, and generates at least one measurement of consumed bandwidth of each said interface. Typically, each monitoring sample is typically taken over a relatively short period of time (e.g., a few seconds), and the server agent determines statistical characterizations of the stream of receive data samples and the stream of transmit data samples, to provide separate short term and long term measurements of the consumed bandwidth of (bandwidth being used on) each interface. Since modern NICs are full-duplex (typically, an NIC of a server can send and receive simultaneously), independent statistics are typically kept for receive data and transmit data on each interface. In a preferred embodiment, the well-known method of determining an exponential moving average of a value (i.e., in this case, an exponential moving average of receive traffic on an interface in a moving time window of fixed duration, or an exponential moving average of transmit traffic on an interface in a moving time window of fixed duration) is used to determine the statistical characterization of the receive traffic on each interface and the statistical characterization of the transmit traffic on each interface (e.g., in the same way described above as do typical embodiments of the inventive adapter agent);

2. For each storage device (e.g., disk drive) access path which has been assigned to the server (in the sense that the storage device is available to be accessed by the server over the path via the converged network), the server agent may cause the server to assert a request to the adapter that is the other endpoint of the path, and the server agent retrieves the adapter's bandwidth (consumed bandwidth and/or available bandwidth) and/or overload information (i.e., the overload and/or bandwidth report generated by the adapter agent of the adapter in response to the request). In many cases, the same adapter is used for several storage devices and paths, so the adapter data received in response to one request can often be used for many paths;

3. For each path over which the server (in which the server agent is implemented) accesses a storage device via an adapter, the server agent calculates whether the path is overloaded and needs to shed load, and what is the path's available (unused) bandwidth. In typical embodiments, the server agent determines the bandwidth available on the path as the minimum of: the bandwidth available on the server's interface (which is coupled along the path) or the bandwidth available on the adapter's interface (which is coupled along the path). In typical embodiments, the server agent determines that the path is overloaded if either the server's interface or the adapter's interface is overloaded (typically, including by using an interface overload indication in a report asserted to the server by the adapter agent in response to a request from the server);

4. If at least one overloaded path is in use (by the server to access any storage device(s)), the server agent typically implements a selection process to assess each overload. In a preferred embodiment, if there are at least two overloaded paths in use by the server, the server agent considers them in random order, and only one is selected per cycle:

if there is another path available (between the server and the adapter coupled along the overloaded path) which is not overloaded and which has sufficient available bandwidth for another storage device, the server agent selects such other path for subsequent use. If two or more such alternative paths are available, the server agent selects the path with the most available bandwidth;

otherwise, if the server (and the server agent thereof) have been informed of a preferred data path between the server and the storage device coupled along the overloaded path, and if the current (overloaded) path is not the path originally assigned by the server to access the storage device, the preferred data path is selected for subsequent use (regardless of whether the preferred data path is overloaded or not). Typically, if the assignment of the current (overloaded) path is not changed (i.e., if no other path is selected to replace the current path), the next overloaded path is considered in the same manner as was the current path;

5. If a new path assignment is made (i.e., if the server agent selects another path to replace the current path), the server agent typically performs the following actions:

it notifies the adapter agent associated with the newly selected path that the server interface (which is coupled along the newly selected path) plans to assert storage data traffic having a specific bandwidth (e.g., a future load of one disk's worth of bandwidth) to a specific interface of the adapter. This immediately affects the statistics and reports being generated by the adapter's adapter agent, and typically prevents (indirectly) two servers from trying to make use of the same excess bandwidth on an adapter interface; and the server agent causes the server to change the routing of storage data traffic between the server and the relevant storage device to the newly selected path; and/or 6. after causing a server to change the routing of storage data traffic between the server and a storage device to a newly selected path, the server agent waits for a time interval (e.g., a predetermined or randomly selected time interval) of sufficient duration so that the consequences of the server agent's recent actions can be reflected in the results (e.g., monitoring statistics) of the ongoing monitoring by each adapter agent of traffic on each adapter interface of the adapter agent. After the wait, the server agent begins to evaluate (e.g., reevaluate) paths to the storage device, including at least one path other than the new path. In a preferred embodiment, the time interval of the wait is determined by a random number selected as a normal variate of a selected interval (e.g., 10 seconds), subject to predetermined minimum and maximum waits.

An exemplary method performed by an embodiment of the inventive system is as follows. A server agent (agent 28 of server 21 of FIG. 2, in the example) sends a planned additional bandwidth use notice to an adapter agent (adapter agent 38 of adapter 25 of FIG. 2, in the example), in response to a determination that server 21 should access a storage device (coupled by adapter 25 to network 20) via a path through a specific interface (i.e., interface 30, in the example) of adapter 25. In response, adapter agent 38 reduces over time (i.e., "ages") the planned additional bandwidth use value indicated by the notice, and maintains an updated (aged) sum of all aged planned additional bandwidth use values received for interface 30 (and uses the aged sum to generate current overload status and available bandwidth indications). As new traffic is actually routed through interface 30, such new actual traffic is included in the per-interface traffic measurements made by adapter agent 38 (and used to generate current overload status and available bandwidth indications for each adapter interface). At the same time, the other adapter agents of the other adapters coupled to the network independently perform their own per-adapter interface traffic measurements (and generate their own per-interface current overload status and available bandwidth indications). Server agent 28 requests (from each adapter agent) reports indicative of current overload status and available bandwidth for each interface of the adapter in which each such adapter agent is implemented and which is part of a path to a storage device used by the server, and in response each queried adapter agent independently sends the requested reports to server agent 28. Server agent 28 uses the reports, and the statistical characterization of traffic which agent 28 itself generates for its own server interfaces, to determine whether to allow server 21 to access the storage device via the current path (assumed by the most-recently asserted planned additional bandwidth use notice), or to select another path (to replace the current path) for access by server 21 to the storage device. If server agent 28 selects a new path for access by server 21 to the storage device, server agent 28 notifies the adapter agent associated with the newly selected path that the server interface (which is to be coupled to the newly selected path) plans to assert storage data traffic having a specific bandwidth to a specific interface of the adapter, and server agent 28 causes server 21 to change the routing of storage data traffic between server 21 and the relevant storage device to the newly selected path. Thus, the system operates (with independent assertion of independently generated reports from individual adapter agents to the server agent of a server) in a decentralized manner to choose a best path for access to a storage device by the server.

In some embodiments of the invention, a server agent (e.g., each of agents 6 and 12 of FIG. 1, or agent 28 of FIG. 2) of a server coupled to a converged network is configured to detect and reroute storage traffic around network bottlenecks other than those resulting from adapter interface traffic or adapter capability. Examples of such bottlenecks are network bottlenecks caused by traditional data communications traffic between the server and other server(s) which may not participate in the rebalancing mechanism.

In a class of preferred embodiments, servers and adapters (e.g., elements 1, 3, 5, 7, 9, and 11 of FIG. 1, each implemented with multiple network interfaces) are coupled to a converged network (e.g., network 20 of FIG. 1) which is an Ethernet network, and the servers and adapters are configured to communicate over the network in accordance with the iSCSI (Internet Small Computer System Interface) networking protocol. In this class of embodiments, the server agents and adapter agents (e.g., agents 6, 12, 14, 16, 18, and 22 of FIG. 1) use the iSCSI network protocol in a simple manner (much simpler than in many conventional applications), in which communication is allowed between a server (e.g., server 1 or 3) and any of adapters (e.g., adapter 5, 7, 9, or 11), but there is just one connection path between each server and each adapter (to a storage device) at a time. In this class of embodiments, the server agents use conventional Multi-Path I/O ("MPIO") techniques (or a new, simplified version of conventional MPIO techniques) to accomplish storage data traffic balancing in accordance with the invention. The expression "MPIO-like subsystem" is used herein to denote either a processing subsystem (e.g., of a server) which implements conventional MPIO, or a processing subsystem which implements a simplified version of conventional MPIO.

In the class of embodiments being described, each server includes a MPIO-like subsystem (e.g., an MPIO driver in the kernel), which manages data input/output in accordance with iSCSI via a selected one of the server's interfaces. The server agent of the server interacts with the MPIO-like subsystem, including by setting a storage device access "policy" which allows storage device access by the server (via the network and one of the adapters) only through one of the server's interfaces which has been selected by the server agent. Such a policy resembles a conventional MPIO "Fail Over Only" policy that does not perform load balancing and which instead uses a single active path for network access (any other potentially usable path is merely a standby path, which is used only if the single active path fails). However, the storage device access policy is used by the inventive server agent in accordance with the invention to implement storage data traffic balancing in a new way. When a server's server agent selects a new path (in accordance with any embodiment of the inventive method, typically including a step of receiving requested reports from adapter agents) for access by the server to a storage device via a newly selected interface of the server, the server agent causes the server to change the routing of storage data traffic (to or from the storage device) to the newly selected path by causing the MPIO-like subsystem to specify a new storage device access "policy" which allows access to the storage device by the server only via the new one of the server's interfaces which has been selected by the server agent. The server agent also causes the new storage device access path to extend to the appropriate adapter interface selected by the server agent.

Thus, in the class of embodiments being described the MPIO-like subsystem is used (by the inventive server agent) to balance storage data traffic on a converged network in accordance with the invention.

MPIO originally was developed on segregated storage networks, and conventional MPIO load balancing would not operate well on converged networks. For example, assume that an attempt were made to use MPIO in a converged network (implemented as an Ethernet network) to balance storage data traffic between multiple Ethernet ports of a server coupled to the network and multiple Ethernet ports of an adapter coupled to the network, where the adapter also has multiple "back end" SAS ports coupled to a disk drive subsystem (i.e., a JBOD) to be accessed by the server. In the example, all conventional load balancing "policies" of MPIO (sending storage commands across all available Ethernet interfaces in round-robin fashion, or determining some measure of how much work is outstanding on each link and sending commands to the 'least busy' Ethernet interface) would typically increase the number of seeks required to execute a sequence of disk access commands, because they would frequently cause consecutive commands in the sequence to take different paths from the server to the disk drive (often causing commands to arrive out of order at the disk drive), and thus would cause the above-described excessive seeking problem as a result of changing storage data paths through the network too rapidly and regardless of whether or not a change is desirable. In contrast, typical embodiments of the invention (including those in which an embodiment of the inventive server agent uses an MPIO-like subsystem of a server to balance storage data traffic on a converged network as described above) would typically not cause the excess seeking problem, since they typically would only change the storage data path for accessing any one disk drive only when necessary, and typically very infrequently (e.g., one, two, or a few times per hour). An important advantage of typical embodiments of the invention is to maintain in-order delivery of commands to a disk via a converged network, while adjusting for cross traffic (to perform storage data traffic balancing).

In another class of embodiments, a server, which implements an embodiment of the inventive server agent, also implements a user interface. During typical operation of the server in such embodiments with a display device coupled to the server, the user interface would cause the display device to display indications of the operations or status of a server agent and/or indications of reports received or determinations made by the server agent. For example, indications of the following types could be displayed: status of the server agent's monitoring of server interface traffic and/or bandwidth, reports (e.g., regarding adapter interface status and available bandwidth) received from adapter agents, and determinations that a currently storage device access path should or should not be changed.

Advantages and features of typical embodiments of the invention include the following:

1. storage data traffic over a converged network is balanced in a fully decentralized manner, with the communication performed to accomplish the balancing occurring only between the endpoints (e.g., server 1 and adapter 5 of FIG. 1, or server 21 and adapter 25 of FIG. 2) of each data path between an adapter and a server (not between servers or between adapters, or from an adapter to two or more servers). The failure of any participant (i.e., server interface, server agent, adapter interface, or adapter agent) only affects the path that the participant is a member of. In general, there is only one-to-one communication between any server agent and an adapter agent (e.g., the server agent does not share this communication with more than one adapter agent). In contrast, conventional methods for balancing storage data traffic among multiple storage devices and multiple servers have not been decentralized in this way.

2. The communication required to implement rebalancing of storage traffic is only between the endpoints (e.g., server 1 and adapter 5 of FIG. 1, or server 21 and adapter 25 of FIG. 2) of each data path between an adapter and a server. Therefore, the number of connections between the servers and adapters is bounded by the number of storage devices (e.g., disk drives) associated with paths between servers and adapters. Thus, even in a very big data center with thousands of servers and adapters, the computational load on each server and adapter, and the network load, needed to implement typical embodiments of the invention is small.

3. There is no pre-reservation or locking of bandwidth for storage data traffic. Therefore the failure of any participant (i.e., server interface, server agent, adapter interface, or adapter agent) will soon be reflected in the overall statistics, and the resources that the participant was using (before the failure) will be automatically available for use by the remaining devices. If the failed device or devices subsequently return, performance of typical embodiments of the inventive method will cause the other servers to redirect traffic away from the path(s) used by the recovered device(s) if the traffic causes an overload.

4. Even when servers send planned additional bandwidth use notices to an adapter, the adapter agent (implemented in the adapter) typically reduces over time (i.e., "ages") the planned additional bandwidth use value indicated by each notice. The aging typically reduces (to zero) the aged planned additional bandwidth use values for each interface of the adapter relatively quickly. Thus, a planned additional bandwidth use notice that does not soon result in additional observed storage data traffic, is quickly ignored.

5. A data path selection by a server that results in a temporary overload is typically rectified (i.e., replaced by a new data path to the same storage device) in a very short time.

6. The process of announcing each server's intention to start using a new path (i.e., the sending, by each server agent, of a planned additional bandwidth use notice to the adapter agent of each adapter that would be directly affected by actual occurrence of the indicated planned additional bandwidth use) prevents many servers making the same decision at nearly the same time. That is, it virtually prevents any oscillations that could occur with nearly simultaneous path decision making based on historical data alone. Otherwise, all servers may see the statistics indicating a lightly loaded interface, and all of them may redirect paths to the interface, resulting in a severe overload condition.

7. The use of random cycles (e.g., in embodiments in which a server agent, after causing a server to change routing of storage data traffic between the server and a storage device to a newly selected path, waits for a randomly determined time interval so that the consequences of the server agent's recent actions can be reflected in monitoring statistics, before the server agent begins to reevaluate paths to the storage device) prevents servers from working in lock step, further avoiding simultaneous conflicting decisions from being made.

8. If the network becomes fully utilized (i.e., all interfaces are overloaded), so that there is no opportunity to redirect storage traffic, in typical embodiments all servers and adapters will revert to the predetermined "preferred" data paths between the servers and adapters. This means that futile redirection attempts will not be made. In addition, if the preferred data paths were selected in a way to balance all the data traffic statically, then they should constitute the optimum configuration in a fully loaded network.

9. No applications (e.g., applications implemented by subsystem 4 of server 1 or subsystem 10 of server 3 of FIG. 1, or subsystem 26 of server 21 of FIG. 2) need to be changed to obtain the advantages of typical embodiments of the invention. Typically, each server agent and adapter agent operates in a way that is invisible to the applications, and any programs and devices that use any of the involved interfaces will benefit from the storage data load balancing (including those programs and devices which are only performing data communications operations).

Other aspects of the invention are an adapter (e.g., any of adapters 5, 7, 9, and 11 of FIG. 1 or any of adapters 25, 27, 29, and 31 of FIG. 2) programmed or otherwise configured to implement an embodiment of the inventive adapter agent), a disk drive (or other storage device) integrated with such an adapter (e.g., an implementation of storage subsystem 15 as a disk drive, integrated with adapter 9 (and adapter 11) as a single device 100, as shown in FIG. 1), a JBOD (or other storage device system) integrated with such an adapter (e.g., an implementation of storage subsystem 33 as a JBOD, integrated with adapter 29 (and adapter 31) as a single device 101, as shown in FIG. 2), a server (e.g., any of servers 1 and 3 of FIG. 1 or server 21 of FIG. 2) programmed or otherwise configured to implement an embodiment of the inventive server agent, a hardware implementation of an embodiment of the inventive server agent (e.g., agent 6 of FIG. 1, implemented in hardware), and a hardware implementation of an embodiment of the inventive adapter agent (e.g., agent 14 of FIG. 1, implemented in hardware).

Other aspects of the invention are methods performed in operation of any embodiment of the inventive system, adapter, storage device, JBOD, server, or other device. One such method includes the steps of:

asserting a request over a converged network from a server to an adapter, wherein the server is configured to include a server agent and the adapter is configured to include an adapter agent;

employing the server agent to identify at least one adapter interface overload indication asserted (i.e., supplied) to a server interface of the server by the adapter agent in response to the request, wherein the adapter interface overload indication is indicative of whether an adapter interface of the adapter is overloaded; and for a path which includes the server interface and over which the server accesses at least one storage device via the adapter, employing the serve agent to determine whether the path is overloaded, in a manner using the adapter interface overload indication.

It should be understood that while certain forms of the invention have been illustrated and described herein, the invention is not to be limited to the specific embodiments described and shown or the specific methods described. The claims that describe methods do not imply any specific order of steps unless explicitly described in the claim language.

What is claimed is:

1. A system, including:
   at least one server having at least one server interface, wherein the server is configured to include a server agent and to be coupled to a converged network by the server interface;
   at least one storage device; and
   at least one adapter configured to be coupled to the storage device and having at least one adapter interface, wherein the adapter is configured to couple the storage device to the network via the adapter interface, and the adapter is configured to include an adapter agent, wherein the adapter agent is coupled and configured:
   to monitor data traffic occurring on each said adapter interface of the adapter, and to generate a consumed bandwidth indication for each said adapter interface, where the consumed bandwidth indication for each said adapter interface is indicative of consumed bandwidth of the adapter interface;
   to generate an available bandwidth indication for each said adapter interface of the adapter, where the available bandwidth indication for each said adapter interface is indicative of available bandwidth of the adapter interface; and
   in response to a request from the server agent, to report to the server at least one bandwidth indication, where the at least one bandwidth indication is at least one said consumed bandwidth indication, or at least one said available bandwidth indication, or at least one said consumed bandwidth indication and at least one said available bandwidth indication, and
   wherein the server agent is coupled and configured:
   to cause the server to assert a request to the adapter agent, and to identify at least one said bandwidth indication supplied to the server by the adapter agent in response to the request; and
   to detect an imbalance in traffic over the network in a manner using at least one said bandwidth indication supplied to the server by the adapter agent in response to the request.

2. The system of claim 1, wherein the server agent is coupled and configured to cause the server to redirect storage data traffic over the network, from one data path between the server and the storage device to a new data path between the server and the storage device, in response to detecting the imbalance, so as to reduce the imbalance and thereby improve performance of the network.

3. The system of claim 1, wherein the server agent is coupled and configured to cause the server to redirect storage data traffic over the network, from one data path between the server and the storage device to a new data path between the server and the storage device, in response to detecting the imbalance.

4. The system of claim 3, wherein the server agent is coupled and configured to wait, after causing the server to redirect storage data traffic between the server and the storage device from said one data path to said new data path, for a time interval of sufficient duration that consequences of the redirection to the new path can be reflected in results of ongoing monitoring by each said adapter agent of traffic on each adapter interface of the adapter agent, and after the wait, to begin to evaluate paths to the storage device, including at least one path other than the new path.

5. The system of claim 4, wherein the time interval of the wait is determined by a random number selected as a normal variate of a selected interval, subject to predetermined minimum and maximum waits.

6. The system of claim 1, wherein the system includes:
   a first adapter configured to couple the storage device to the network; and
   a second adapter configured to couple the storage device to the network, wherein the first adapter includes at least one first adapter interface, and the second adapter includes at least one second adapter interface, the first adapter includes a first adapter agent, and the second adapter includes a second adapter agent, and the server agent is coupled and configured:
   to monitor data traffic occurring on each said server interface to determine consumed bandwidth of each said server interface, and to determine, from the consumed bandwidth of each said server interface, available bandwidth of each said server interface; and
   to identify at least one available bandwidth indication supplied to the server by the first adapter agent in response to a request asserted from the server to the first adapter, wherein each said available bandwidth indication is indicative of available bandwidth of one said first adapter interface, and to identify at least one additional available bandwidth indication supplied to the server by the second adapter agent in response to a request asserted from the server to the second adapter, wherein each said additional available bandwidth indication is indicative of available bandwidth of one said second adapter interface; and to determine available bandwidth on a path which includes the server interface and one said second adapter interface of the second adapter, as the minimum of the available bandwidth on the server interface and the available bandwidth of said one said second adapter interface.

7. The system of claim 1, wherein the adapter agent is also coupled and configured to estimate capacity of the adapter to process additional data.

8. The system of claim 1, wherein the adapter agent is coupled and configured to generate the available bandwidth indication for each said adapter interface of the adapter, including by:
aging each planned additional bandwidth use value received from at least one said server agent for one said adapter interface, thereby generating an aged planned bandwidth use value for the adapter interface, and maintaining a sum, for each said adapter interface, of each said aged planned bandwidth use value for the adapter interface.

9. The system of claim 8, wherein the adapter agent is coupled and configured to generate the available bandwidth indication for each said adapter interface of the adapter, from the adapter interface's full available bandwidth, at least one measurement of the adapter interface's consumed bandwidth, an indication of the adapter's capacity to process additional data, and the sum for the adapter interface of each said aged planned bandwidth use value for the adapter interface.

10. An adapter, configured for use in a system including at least one server coupled to a converged network by at least one server interface, and at least one storage device, wherein the server includes a server agent, said adapter including:
at least one port configured to couple the storage device to the adapter;
at least one adapter interface configured to couple the adapter to the network, and thereby to couple the storage device to the network via the adapter when said storage device is coupled to said at least one port; and
an adapter agent, wherein the adapter agent is coupled and configured:
to monitor data traffic occurring on each said adapter interface of the adapter, and to generate a consumed bandwidth indication for each said adapter interface, where the consumed bandwidth indication for each said adapter interface is indicative of consumed bandwidth of the adapter interface;
to generate an available bandwidth indication for each said adapter interface of the adapter, where the available bandwidth indication for each said adapter interface is indicative of available bandwidth of the adapter interface; and
in response to a request from the server agent, to cause the adapter to assert, to at least one said adapter interface, data indicative of at least one bandwidth indication, where the at least one bandwidth indication is at least at least one said consumed bandwidth indication, or at least one said available bandwidth indication, or at least one said consumed bandwidth indication and at least one said available bandwidth indication.

11. The adapter of claim 10, wherein the adapter agent is also coupled and configured to estimate capacity of the adapter to process additional data.

12. The adapter of claim 10, wherein the adapter agent is coupled and configured to generate the available bandwidth indication for each said adapter interface, including by:
aging each planned additional bandwidth use value received from at least one said server agent for one said adapter interface, thereby generating an aged planned bandwidth use value for the adapter interface, and maintaining a sum, for each said adapter interface, of each said aged planned bandwidth use value for the adapter interface.

13. The adapter of claim 12, wherein the adapter agent is coupled and configured to generate the available bandwidth indication for each said adapter interface, from the adapter interface's full available bandwidth, at least one measurement of the adapter interface's consumed bandwidth, an indication of the adapter's capacity to process additional data, and the sum for the adapter interface of each said aged planned bandwidth use value for the adapter interface.

14. A device configured for use in a system including at least one server coupled to a converged network by at least one server interface, wherein the server includes a server agent, wherein the device is a storage device integrated with an adapter, and includes:
a data storage subsystem; and
an adapter subsystem coupled to the data storage subsystem, wherein the adapter subsystem implements the adapter, and the adapter subsystem comprises:
at least one adapter interface configured to couple the adapter subsystem to the network, and thereby to couple the data storage subsystem to the network via the adapter subsystem; and
an adapter agent, wherein the adapter agent is coupled and configured:
to monitor data traffic occurring on each said adapter interface of the adapter, and to generate a consumed bandwidth indication for each said adapter interface, where the consumed bandwidth indication for each said adapter interface is indicative of consumed bandwidth of the adapter interface;
to generate an available bandwidth indication for each said adapter interface of the adapter, where the available bandwidth indication for each said adapter interface is indicative of available bandwidth of the adapter interface; and
in response to a request from the server agent, to cause the adapter to assert, to at least one said adapter interface, data indicative at least one bandwidth indication, where the at least one bandwidth indication is at least one said consumed bandwidth indication, or at least one said available bandwidth indication, or at least one said consumed bandwidth indication and at least one said available bandwidth indication.

15. The device of claim 14, wherein said device is a storage device integrated with an adapter, the adapter subsystem implements the adapter, and the data storage subsystem implements said storage device.

16. The device of claim 15, wherein the storage device is a disk drive.

17. The device of claim 14, wherein said device is a JBOD integrated with an adapter, the adapter subsystem implements the adapter, the data storage subsystem implements said JBOD, and the JBOD includes a set of disk drives.

18. The device of claim 14, wherein the data storage subsystem includes at least two disk drives.

19. The device of claim 14, wherein the adapter agent is also coupled and configured to estimate capacity of the adapter subsystem to process additional data.

20. The device of claim 14, wherein the adapter agent is coupled and configured to generate the available bandwidth indication for each said adapter interface, including by:

aging each planned additional bandwidth use value received from at least one said server agent for one said adapter interface, thereby generating an aged planned bandwidth use value for the adapter interface, and maintaining a sum, for each said adapter interface, of each said aged planned bandwidth use value for the adapter interface.

21. The device of claim 20, wherein the adapter agent is coupled and configured to generate the available bandwidth indication for each said adapter interface, from the adapter interface's full available bandwidth, at least one measurement of the adapter interface's consumed bandwidth, an indication of the adapter subsystem's capacity to process additional data, and the sum for the adapter interface of each said aged planned bandwidth use value for the adapter interface.

22. A server, configured for use in a system including at least one storage device and at least one adapter coupled to the storage device, wherein the adapter has at least one adapter interface coupled to a converged network, the adapter couples the storage device to the network via the adapter interface, and the adapter is configured to include an adapter agent, said server including:
a processing subsystem configured to include a server agent; and
at least one server interface configured to be coupled to the network, wherein the processing subsystem is coupled to the server interface, and is configured to access the network via the server interface when said server interface is coupled to the network, and wherein the server agent is coupled and configured:
to cause the processing subsystem to assert a request to the adapter agent, and to identify at least one bandwidth indication supplied to the server by the adapter agent in response to the request, where the at least one bandwidth indication is at least one consumed bandwidth indication, or at least one available bandwidth indication, or at least at least one consumed bandwidth indication and at least one available bandwidth indication; and
to detect an imbalance in traffic over the network in a manner using at least one said bandwidth indication supplied to the server by the adapter agent in response to the request.

23. The server of claim 22, wherein the server agent is coupled and configured to cause the server to redirect storage data traffic over the network, from one data path between the server and the storage device to a new data path between the server and the storage device, in response to detecting the imbalance, so as to reduce the imbalance and thereby improve performance of the network.

24. The server of claim 22, wherein the server agent is coupled and configured to cause the server to redirect storage data traffic over the network, from one data path between the server and the storage device to a new data path between the server and the storage device, in response to detecting the imbalance.

25. The server of claim 24, wherein the server agent is coupled and configured to wait, after causing the server to redirect storage data traffic between the server and the storage device from said one data path to said new data path, for a time interval of sufficient duration that consequences of the redirection to the new path can be reflected in results of ongoing monitoring by each said adapter agent of traffic on each adapter interface of the adapter agent, and after the wait, to begin to evaluate paths to the storage device, including at least one path other than the new path.

26. The server of claim 25, wherein the time interval of the wait is determined by a random number selected as a normal variate of a selected interval, subject to predetermined minimum and maximum waits.

27. The server of claim 22, wherein the system includes a first adapter configured to couple the storage device to the network, and a second adapter configured to couple the storage device to the network, wherein the first adapter includes at least one first adapter interface, and the second adapter includes at least one second adapter interface, the first adapter includes a first adapter agent, and the second adapter includes a second adapter agent, wherein the server includes at least a first server interface and a second server interface, and wherein the server agent is coupled and configured:
to monitor data traffic occurring on each said server interface to determine consumed bandwidth of each said server interface, and to determine, from the consumed bandwidth of each said server interface, available bandwidth of each said server interface; and
to identify at least one available bandwidth indication supplied to the first server interface by the first adapter agent in response to a request asserted from the processing subsystem to the first adapter, wherein each said available bandwidth indication is indicative of available bandwidth of one said first adapter interface, and to identify at least one additional available bandwidth indication supplied to the second server interface by the second adapter agent in response to a request asserted from the processing subsystem to the second adapter, wherein each said additional available bandwidth indication is indicative of available bandwidth of one said second adapter interface; and
to determine available bandwidth on a path which includes the second server interface and one said second adapter interface of the second adapter, as the minimum of the available bandwidth on the second server interface and the available bandwidth of said one said second adapter interface.

28. The server of claim 22, wherein the adapter agent is coupled and configured to generate an available bandwidth indication for each said adapter interface of the adapter,
and wherein the server agent is coupled and configured:
to identify at least one said available bandwidth indication supplied to the server interface by the adapter agent in response to the request; and
to assess a path which includes the server interface and at least one said adapter interface in a manner using the available bandwidth indication.

29. A method, including steps of:
asserting a request over a converged network from a server to an adapter, wherein the server is configured to include a server agent and the adapter is configured to include an adapter agent;
employing the server agent to identify at least one bandwidth indication supplied to the server by the adapter agent in response to the request, where the at least one bandwidth indication is at least one consumed bandwidth indication, or at least one available bandwidth indication, or at least one consumed bandwidth indication and at least one available bandwidth indication; and
detecting an imbalance in traffic over the network in a manner using at least one said bandwidth indication supplied to the server by the adapter agent in response to the request.

30. The method of claim 29, including a step of employing the server agent to cause the server to redirect storage data traffic over the network, from one data path between the server and a storage device to a new data path between the server and the storage device, in response to detecting the imbalance, so as to reduce the imbalance and thereby improve performance of the network.

31. The method of claim 29, including a step of employing the server agent to cause the server to redirect storage data traffic over the network, from one data path between the server and a storage device to a new data path between the server and the storage device, in response to detecting the imbalance.

32. The method of claim 31, including a step of employing the server agent to wait, after causing the server to redirect storage data traffic between the server and the storage device from said one data path to said new data path, for a time interval of sufficient duration that consequences of the redirection to the new path can be reflected in results of ongoing monitoring by each said adapter agent of traffic on each adapter interface of the adapter agent, and after the wait, to begin to evaluate paths to the storage device, including at least one path other than the new path.

33. The method of claim 32, wherein the time interval of the wait is determined by a random number selected as a normal variate of a selected interval, subject to predetermined minimum and maximum waits.

34. The method of claim 29, also including steps of:
employing the server agent to monitor data traffic occurring on each server interface of the server to determine consumed bandwidth of said each server interface, and to determine, from the consumed bandwidth of each said server interface, available bandwidth of each said server interface; and
employing the server agent to identify at least one available bandwidth indication supplied to the server by a first adapter agent, of a first adapter coupled to the network, in response to a request asserted from the server to the first adapter, wherein each said available bandwidth indication is indicative of available bandwidth of an adapter interface of the first adapter, and to identify at least one additional available bandwidth indication supplied to the server by a second adapter agent, of a second adapter coupled to the network, in response to a request asserted from the server to the second adapter, wherein each said additional available bandwidth indication is indicative of available bandwidth of an adapter interface of the second adapter; and
employing the server agent to determine available bandwidth on a path which includes one said server interface and an adapter interface of the second adapter, as the minimum of the available bandwidth on the server interface and the available bandwidth of an adapter interface of the second adapter.

35. The method of claim 29, also including a step of employing the adapter agent to generate an available bandwidth indication for each adapter interface of the adapter, where the available bandwidth indication for each said adapter interface is indicative of available bandwidth of the adapter interface, including by:
aging each planned additional bandwidth use value received from at least one said server agent for one said adapter interface, thereby generating an aged planned bandwidth use value for the adapter interface, and maintaining a sum, for each said adapter interface, of each said aged planned bandwidth use value for the adapter interface.

36. The method of claim 35, including a step of employing the adapter agent to generate the available bandwidth indication for each said adapter interface of the adapter, from the adapter interface's full available bandwidth, at least one measurement of the adapter interface's consumed bandwidth, an indication of the adapter's capacity to process additional data, and the sum for the adapter interface of each said aged planned bandwidth use value for the adapter interface.

* * * * *